United States Patent [19]
Wright

[11] Patent Number: 5,103,685
[45] Date of Patent: Apr. 14, 1992

[54] WRIST-WORM RATE OF ASCENT/DESCENT INDICATOR

[76] Inventor: Gregory Wright, 181 High Crest Dr., West Milford, N.J. 07480

[21] Appl. No.: 600,007

[22] Filed: Oct. 16, 1990

[51] Int. Cl.$^5$ .................. G01F 23/18; G01L 9/06; G01D 7/00
[52] U.S. Cl. .................. 73/865.1; 73/866.3
[58] Field of Search ............ 73/865.1, 866.1, 866.2, 73/866.3, 431

[56] References Cited

U.S. PATENT DOCUMENTS

| | | | |
|---|---|---|---|
| 3,505,808 | 4/1970 | Eschle | 73/865.1 X |
| 3,992,948 | 11/1976 | D'Antonio et al. | 73/865.1 |
| 4,005,282 | 1/1977 | Jennings | 73/865.1 X |
| 4,107,995 | 8/1978 | Ligman et al. | 73/865.1 X |
| 4,109,148 | 8/1978 | Etra | 73/865.1 X |
| 4,399,707 | 8/1983 | Wamstad | 73/721 X |
| 4,658,358 | 4/1987 | Leach et al. | 73/865.1 X |
| 4,794,803 | 1/1989 | Osterhout et al. | 73/866.2 X |
| 4,820,953 | 4/1984 | Saubolle et al. | 73/865.1 X |
| 4,882,678 | 11/1989 | Hollis et al. | 73/865.1 X |

*Primary Examiner*—Tom Noland
*Attorney, Agent, or Firm*—John D. Kaufmann

[57] ABSTRACT

A wrist-worn, real-time-indicating, actual rate of ascent/decent meter includes a non-corrodable, hermetic enclosure with a window. A display, visible through the window, includes numeric rate-related indicia and arrows, both clearly visible against a contrasting backdrop. The contrast may be black on silver. A hysterisis-free transducer in the enclosure produces first signals proportional to the ambient pressure. The first signals are converted to second signals representing depth in the ambient, the latter signals being periodically sampled. Each sample is compared to the previous sample and third rate-of-change-of-depth-with-time signals result from successive comparisons. The third signals are displayed numerically and direction (ascending or descending) is indicated by the arrows. Signal processing is controlled and performed by a microprocessor within the enclosure. Facilities are provided to replace a battery and to turn the meter on and off without affecting the hermeticity of the enclosure.

15 Claims, 2 Drawing Sheets

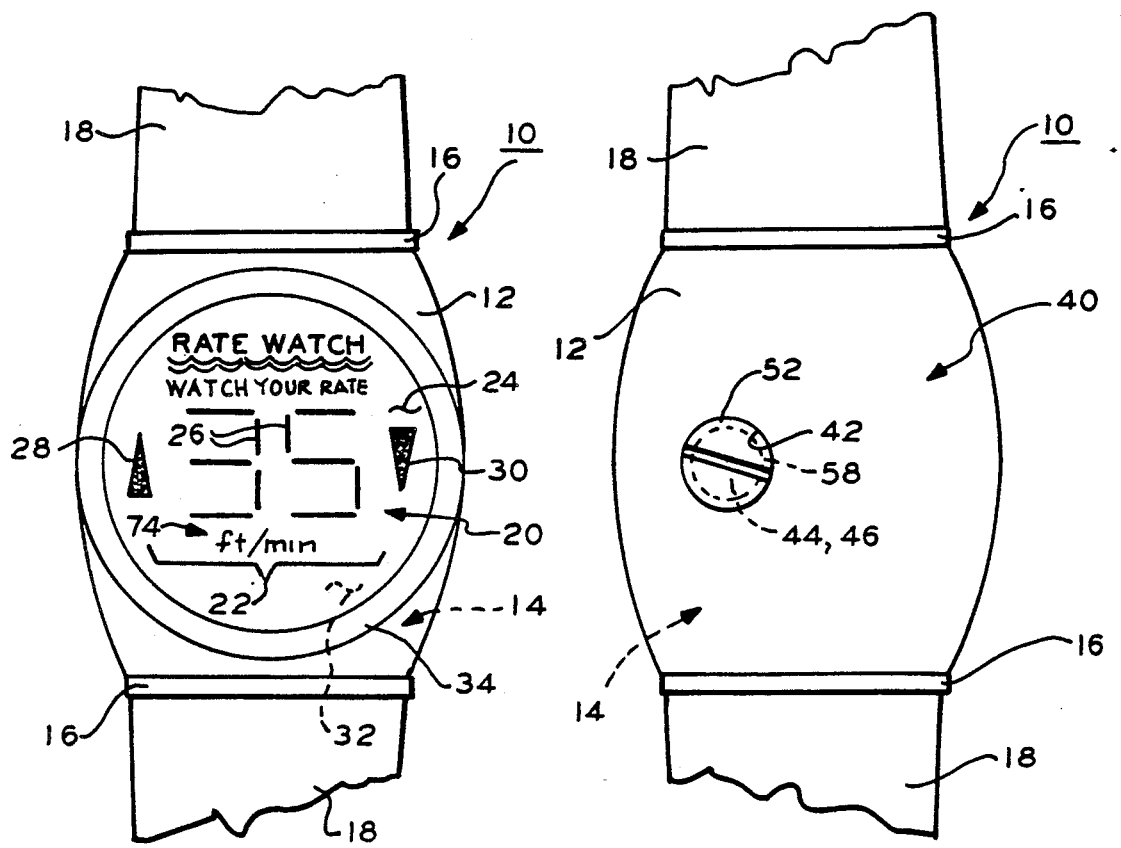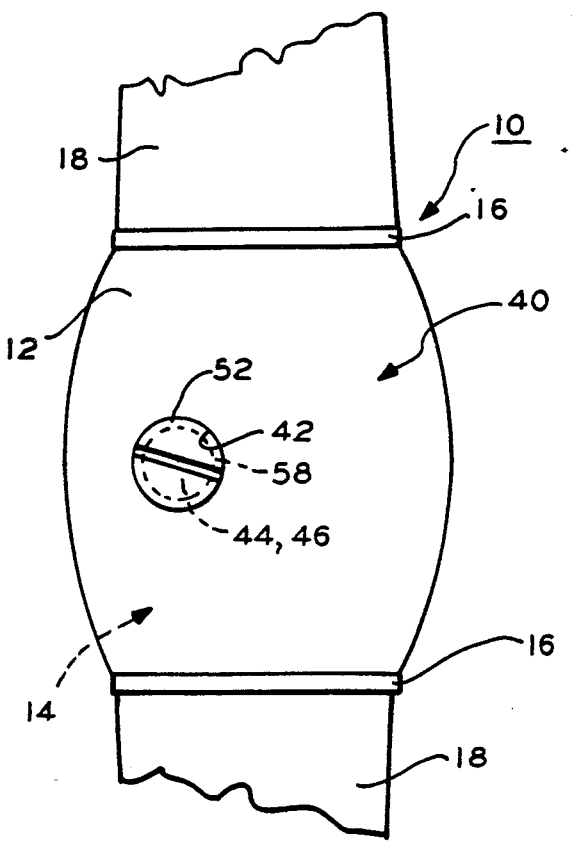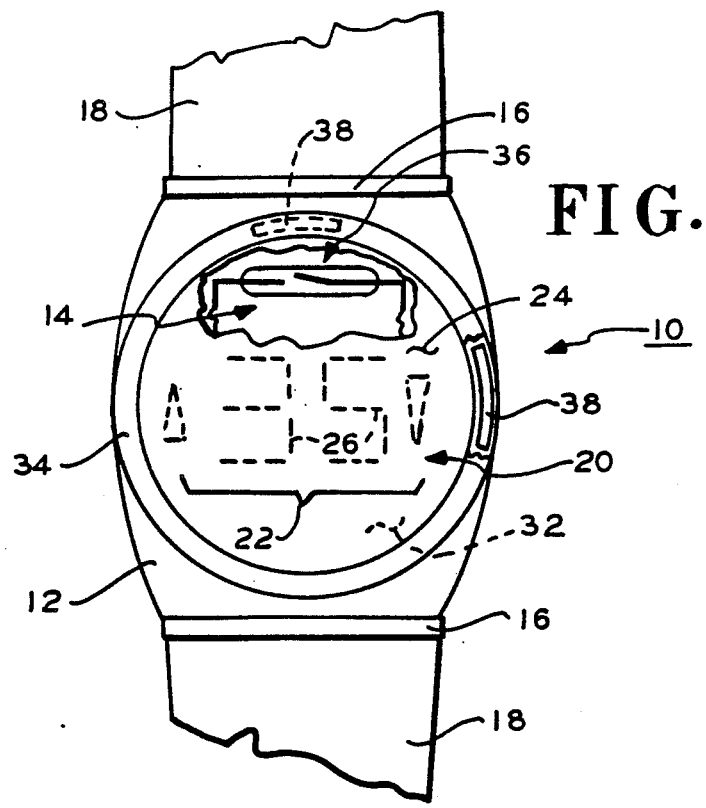

WRIST-WORM RATE OF ASCENT/DESCENT INDICATOR

FIELD OF THE INVENTION

The present invention relates to a device which indicates the rate of ascent/descent in an ambient, and, more particularly, to a wrist-worn, watch type device which presents a real time indication of the actual rate of ascent and descent to a person involved in underwater activities, such as SCUBA, snorkling or skindiving.

BACKGROUND OF THE INVENTION

For many years the dangers involved with ascending too rapidly following a dive in water have been known. These dangers derive from the action of gases within the body as the body experiences pressure changes.

Air is a mixture of many gases, primarily nitrogen (78%) and oxygen (20%). In a normal ambient conditions, a person inhales air at a normal atmospheric pressure of about 14.7 p.s.i., a portion of the air passing through the lung tissues into the blood. The blood supplies the body cells with oxygen from the air and in turn receives waste carbon dioxide from the cells which it transports to the lung tissues for exhalation. The gases in air when inhaled at normal atmospheric pressure are absorbed by the body.

When air for respiration is supplied to a person in an ambient having a pressure substantially higher than normal atmospheric pressure—such as occurs in an underwater ambient—the air must be supplied at an elevated pressure to offset the pressure of the ambient. The increased pressure results in higher quantities of air, and its constituent gases, being absorbed by the body than would be absorbed at normal atmospheric pressure.

Various types of equipment for supplying air at higher pressure such as self-contained underwater breathing apparatus, or SCUBA) are today readily available and have made possible extended dives in water to great depths. However, the use of such equipment is accompanied by the possibility of hazard.

If inert gases in air, primarily nitrogen, which are dissolved in the body are too quickly released from solution and cannot be safely discharged from the body through the lungs, decompression sickness, or "the bends," occurs. If the ambient pressure to which a person is subjected decreases, inert gases previously dissolved in the blood and body tissues tend to be released from the solution. Such a pressure decrease occurs during ascent from a lower level in a body of water. If the rate of ascent is sufficiently low, the body is able to efficiently discharge the inert gases released from solution and no harm to the body occurs. If the rate of ascent is too high, the body is not able to efficiently discharge these gases (primarily nitrogen) released from solution. As a result, nitrogen gas bubbles form in the body due to the now supersaturated condition of the blood and tissues in which they are located.

These released nitrogen bubbles travel with the blood stream. Should a bubble become lodged in the heart or brain, it can cause death or paralysis. Less serious, but extremely unpleasant and/or painful, are the physiological effects on body tissue of the gasses and the bubbles thereof as they are released from solution. These effects include pain, numbness and muscle weakness. All of the foregoing are often, possibly somewhat imprecisely, referred to as "the bends."

Avoiding "the bends" has been found to be a matter of giving the body sufficient time to discharge through the lungs gases which are released from solution so that bubbles do not form. The body may be afforded this time by appropriate control of the rate of ascent. Ascent at a controlled rate which enables the discharge of nitrogen from the body through the lungs is a part of every experienced diver's basic lore. Ascent at an appropriate rate assures that nitrogen will not be released into or from the blood as bubbles. This appropriate rate may combine controlled ascent with decompression or rest stops during ascent.

Early diving experience with large numbers of divers led the U.S. Navy to produce and circulate its Decompression Tables. These Tables have set the "standard" for ascents at 60 feet per minute. Although dives to great depths may require the earlier noted combination of controlled ascent and rest stops, the U.S. Navy Decompression Tables instruct that ascents from typical depths at rates of 60 feet per minute or less will permit the body to safely discharge gases released from solution to avoid bubble formation and "the bends."

Unfortunately, these Decompression Tables and the 60 feet per minute ascent rate were originally set for male divers aged 19-25 years and in peak physical condition. Recent research indicates that age, sex, physical fitness and individual physiological differences among people all have a bearing on a safe ascent rate, as do depth and duration of dive. The weight of evidence is that a "typical safe" rate of ascent generally applicable is less than 60 feet per minute. Further, there is strong evidence that each person's "safe" rate of ascent is unique and can be arrived at by experience gained from numerous dives and experimentation.

One method of determining one's rate of ascent and for ensuring that a "standard" such as 60 feet per minute is not exceeded, is to carry during the dive a depth guage and a watch. These two measuring devices can be used to periodically calculate rate of ascent. The foregoing technique is inconvenient and subject to error. Two measuring instruments must be carried and nearly simultaneously read and then a calculation must be made. The stress of the dive itself and of events or emergencies—such as low air supply, injury, loss of sense of vertical direction or poor visibility—occurring during the dive create the possibility that the calculations will be erroneously performed, if they are performed at all.

Devices which can accompany a diver and which can alert or inform the diver that a "standard" rate of ascent is being exceeded are known. See, for example the following U.S. Pat. Nos.: 4,820,953; 4,109,140; 4, 107,995; and 3,992,948. Typically, the "standard" is the 60 feet per minute from the U.S. Navy's Dive Tables. In some cases the "standard" may be adjustable to some other ascent rate. The output from the devices of the foregoing patents is of the "go/no-go" variety. Specifically, these prior art devices give the diver no indication of the rate of ascent but merely alert or inform when a pre-set "standard" rate of ascent is being exceeded. By the time the diver receives this information, conditions conducive to "the bends" may have been present for an appreciable time. The diver receives no quantitative data regarding rates of ascent below or above the "standard," and, thus, the diver cannot determine how much or for how long to slow or stop ascent to counteract those effects which may cause "the bends."

U.S. Pat. No. 4,658,358 discloses an underwater computer. This device includes a microprocessor which computes water pressure, depth, minimum depth to which the diver can safely ascent, the minimum time for safe ascent to the water surface, and the elapsed time since the beginning at the dive. The minimum depth and minimum time values are based on an algorithm controlling the operation of the microprocessor. The results of the computation are displayed to the diver. The device does not calculate or display the real time rate of ascent of the diver. Accordingly, if the diver does not "match" the algorithm, the minimum depth and time calculations may be misleading.

Safe diving would seem to require a device which provides a real time indication of the actual rate of ascent and descent of a diver, as opposed to a go/no-go indication that a possibly inapplicable "standard" has been exceeded. Such a device should be easy to use, reliable, easy to read and, preferably, wearable on the diver's body or mounted in a divers console. All of the foregoing are objects of the present invention.

There is some evidence that a diver's rate of descent may play a role in physiological condition during and after a dive. Although the precise role played by descent rate is presently not well defined, a convenient means for ascertaining this value during a dive would be desirable, and the provision of such a means is a further object of the present invention.

SUMMARY OF THE DISCLOSURE

With the above and other objects in view, the present invention contemplates a wrist-worn or console mounted device for use during diving. The device calculates and displays to the diver the real time, actual rate of ascent and descent of the diver.

The device includes an enclosure surrounding a hermetically sealed volume. The enclosure is preferably constructed of plastic or other non-corrodable material. The enclosure includes a window. Within the enclosure and visible through the window is a display. The display comprises indicia, which constitute both numbers and arrow-like characters, which are visible against a contrasting backdrop. Preferably, the display is a liquid crystal array which displays black indicia and the backdrop is reflective silver. Tests have shown that black against reflective silver is highly visible and discernible in low-light, underwater environments.

Located within the volume is a non-temperature sensitive, hysterisis-free, solid state pressure transducer. The transducer produces a first output signal which is proportional to the pressure of the surrounding ambient. In preferred embodiments, the transducer includes a diaphragm and four piezoresistive strain gauge resistors which are implanted or diffused in the diaphragm. The resistors are connected together in a Wheatstone bridge configuration. When the diaphragm deflects in response to the pressure of the ambient, the output of the bridge, which is the first output signal, is proportional to the actual real-time value of such pressure.

A first facility within the volume converts the first output signal to a second output signal representative of the actual real-time depth of the device within the ambient. The first facility comprise may comprise a conditioner for the first output signal and an analog-to-digital converter for converting the conditioned, analog, first output signal to a digital second output signal.

A second facility within the volume periodically samples the second output signal following successive equal time intervals. This second facility compares successive second output signals and produces successive third output signals indicative of the actual, real-time rate of change of depth with time.

A third facility within the volume activates the display in response to the third output signals. As so activated, the display presents visually detectable numeric indicia indicative of the real-time rate of ascent or descent in the ambient. These indicia preferably indicate the actual, real-time rate of ascent or descent in units such as feet per minute or meters per minute. The indicia also include arrow-like characters which indicate which, ascent or descent, is presently occurring.

The first, second and third facilities may include or may constitute a portion of a microprocessor within the volume. The microprocessor, which may include a crystal-stabilized clock, executes a non-volatile program which is stored in a read-only memory accompanying the microprocessor.

A power source energizes the display, the transducer and the first, second and third facilities. The power source, preferably a small battery, is located in a compartment formed in the enclosure separately from the volume. When the compartment is closed, the power source is provided with an ambient-proof environment. When the compartment is opened to test or replace the power source, the hermetic character of the volume is not invaded or affected.

A fourth facility selectively connects and disconnects the power source to the display, the transducer and the first, second and third facilities. Connection and disconnection are achieved without invading or in any way affecting the hermetic character of the volume. Preferably, the fourth facility includes a normally open magnetically operated switch, such as a reed switch, within the volume. When the switch is open, the power source is disconnected from the display, the transducer and the facilities within the volume. When the switch is closed, the power source energizes all of these items, rendering them operative. The switch is rotatably mounted to the exterior of the enclosure, preferably about the window, in a bezel. The bezel includes a magnet or magnetized segment. Rotation of the bezel selectively positions the magnet close to or remote from the switch. When the magnet is close to the switch, the switch is held closed. When the magnet is remote from the switch, the switch assumes its normal open state. Indicia may be included on the bezel and the enclosure which mutually indicate whether the reed switch is open or closed indicating "on" or "off" depending on the rotational position of the bezel.

DESCRIPTION OF THE DRAWINGS

FIG. 1 is a plan view of the face of a device for indicating the real-time, actual rate of ascent and descent of a diver according to the present invention;

FIG. 2 is a plan view of the back of the device of FIG. 1;

FIG. 4 is a partially sectioned view of the face of the device in FIG. 1, depicting facilities for applying power from the power source of FIG. 3 to elements within the device.

DETAILED DESCRIPTION

Figure 5:
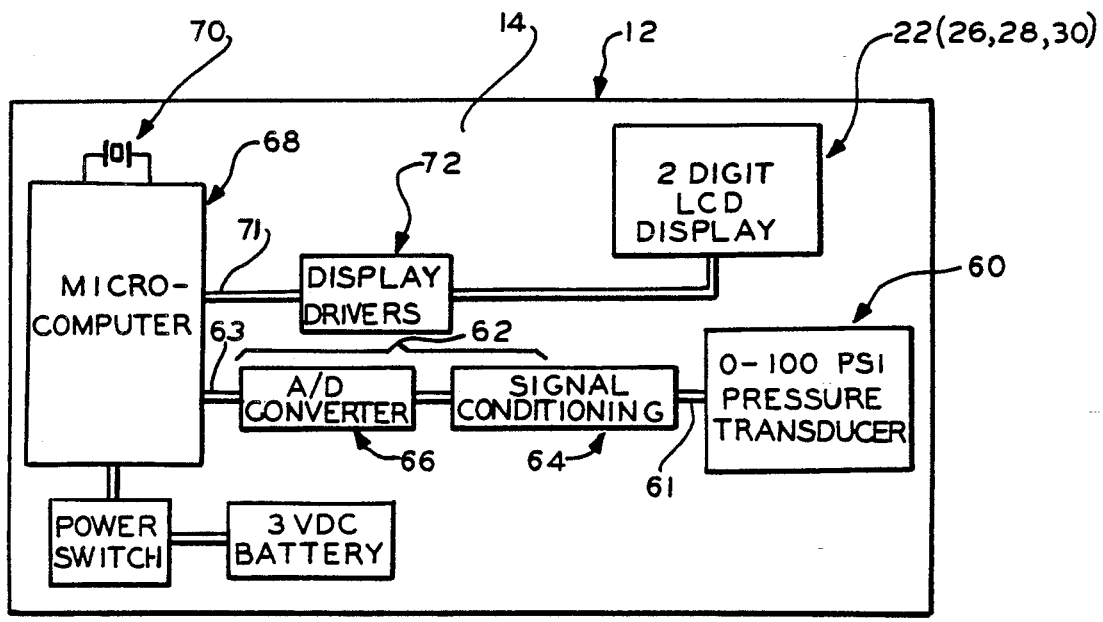
FIG. 5 is a schematic, block diagram of the functional elements of the device of the present invention.

Referring first to FIG. 1, there is shown a device 10 according to the present invention for displaying the real-time, actual rate of ascent and descent of a diver. The device includes an enclosure 12, which is preferably made of non-corrodable plastic or other material and which will permit the interior volume 14 of the enclosure 12 to be hermetically sealed. The enclosure 12 may include attaching pins (not shown) or similar facilities within end portions 16 thereof for mounting the ends of wrist straps 18 thereto. The enclosure 12 may be removably includable in a dive console (not shown), in which case the straps 18 may or may not be present.

The face 20 of the device 10 shown in FIG. 1 includes a display 22 which is visible through a transparent window 24. The display 22, which may comprise a liquid crystal display of any well known type, comprises two numeric characters 26 and two arrow-like characters 28 and 30. Preferably the characters 26, 68, 30 show as black through the window 24. The display 22 also includes a backdrop 32 which is colored to drastically contrast the color of the characters 26, 28, 30. Preferably, the backdrop 32 is a reflective silver color. It has been found that the black characters 26, 28, 30 against the reflective silver backdrop 32 are easily and clearly readable under water in low light conditions.

Rotatably mounted to the face 20 of the device 10 is a bezel 34 surrounding the window 24. The rotation of the bezel 34 may be achieved in any convenient manner. The bezel 34 may be black (FIG. 1) or a lighter color (FIG. 4). Referring to FIGS. 1 and 4, behind the backdrop 32 of the display 22 and within the hermetic volume 14 of the enclosure 12 is a small, magnetically operated switch 36, which may be a magnetic reed switch or any other equivalent element. The switch 36, which is normally open, applies power from a power source to the elements of the device 10 within the hermetic volume 14 when it is closed. The power source and the elements within the volume 14 are discussed below.

The rotatable bezel 34 includes a magnet or a magnetized segment 38 (FIG. 4). The magnet 38 may be adhered to the bezel 34, which may be made of plastic or another non-magnetic material. The magnet 38 may also be molded into, or otherwise incorporated into the bezel 34 in any known way, as shown in FIG. 4, where a portion of the bezel 34 has been broken away.

When the bezel 34 is rotated so that the magnet 38 is remote from the switch 36 (as in FIG. 4), the switch 36 assumes its normally open state. When the bezel 34 is rotated to bring the magnet 38 proximate to the switch 36, as shown by the phantom segment 38 in FIG. 4, the magnetic force thereof closes the switch 36. Closure of the switch 36 applies power to the elements of the device 10 within the hermetic volume 14.

Figure 3:
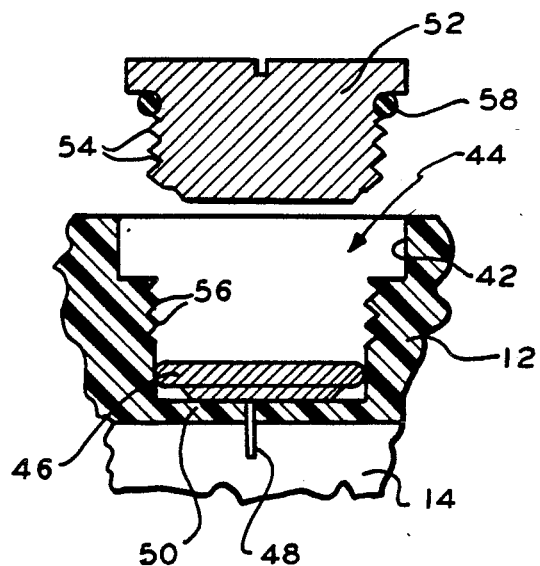
FIG. 3 is an enlarged view of a portion of FIG. 2 showing the manner of retaining a power source for the device of FIG. 1.

Referring to FIGS. 2 and 3 the back 40 of the device 10 may be seen to include an opening 42 providing access to a compartment 44 which holds a battery 46. The battery 46 serves as the power source for the elements of the device 10 within the hermetic volume 14. The compartment 44 is formed so as to be separated from the hermetic volume 14. Accordingly, gaining access to the battery 46 for purposes of replacement or testing does not invade the hermetic character of the volume 14. The formation of the compartment 44 and its separation from the hermetic volume 14 may be achieved by any known plastic or other technique. Electrical connection between the battery 46, the switch 36 and the other elements of the device 10 within the hermetic volume 14 may be achieved by known feed-through techniques by which one or more electrical conductors 48 are fed through a web or plenum 50 separating the compartment 44 and the volume 14.

The battery 46, which may be a 3Vdc disk-like cell, is held in the compartment 44 and shielded from the ambient by a plug 52 which is selectively insertable into and removable from the opening 42. Preferably, the plug 52 and the opening 42 are threaded, as at 54 and 56, to achieve this end. The plug 52 may include a flexible O-ring or gasket 58 which seals the compartment against entry of the ambient when the plug 52 is inserted.

Referring now to FIG. 5, there is shown a schematic block diagram of the various elements within the enclosure, schematically depicted at 12, of the device 10. These elements are individually known and commercially available and may assume any convenient configuration.

Within the enclosure 12 is a pressure transducer 60. The pressure transducer 60 is non-temperature sensitive, that is, its output function is unaffected by changes in ambient temperature. Further, the pressure transducer is also hysterisis-free. The pressure transducer 60 produces an output signal at 61 which is proportional to its location in the surrounding ambient. A preferred transducer 60 is a solid-state element available from IC Sensors of Milpitas, Calif. as a type-model 10 and sold under the designation OEM Pressure Guage. This type of transducer 60 includes a diaphragm having four piezoresistive strain gauges implanted or diffused therein and connected together in a Wheatstone bridge configuration. Changes in pressure deflect the diaphragm so that the analog output 61 from the bridge is proportional to such pressure.

The pressure-dependent analog output 61 from the transducer 60 is applied to the input 61 of a facility 62 which converts this output 61 to a digital output 63 representative of the depth of the device 10 within the ambient. The facility 62 may include a signal conditioner 64 and analog-to-digital converter 66, both of standard manufacture. In a fluid ambient, the pressure at a given depth is proportional to the depth of the device 10 in the ambient, here water. An appropriate signal conditioner 64 is available from Linear Technology of Milpitas, Calif. as a type/model LT1013A and sold under the designation OPAMP. A suitable digital-to-analog converter 66 is also available from Linear Technology of Milpitas, Calif. as a type/model LTC1091 and sold under the designation 10 BIT A/D.

The output 63 of the facility 62 is applied to an input 63 of a microprocessor 68. A suitable microprocessor 68 is available from OKI Semiconductor of Sunnyvale, Calif. as a type/model MSM5052 and sold under the designation Microcontroller.

Read only memory (ROM) of the microprocessor 68 stores a non-volatile program which causes the microprocessor 68 to operate as described below. The microprocessor 68 includes an internal clock which is crystal stabilized, as depicted at 70.

The microprocessor 68 periodically samples the output 63 of the facility 62. Each sampled output 63 is compared to the last output 63 of the facility 62 to produce an output 71 representative of the "delta" or change, positive or negative, between the previous and the present depth-representative output 63 from the facility 62. Sampling is effected at successive, equal time intervals. The sampling and the time intervals thereof are controlled by the crystal-stabilized clock of the microprocessor 68.

Thus, the microprocessor 68 periodically calculates the rate of change to depth with respect of time and produces successive outputs 71 representative thereof. These outputs 71 from the microprocessor 68 are applied to display drivers 72 for the display 22, which in turn cause the numeric characters 26 of the display 22 to exhibit the real-time, actual rate of ascent or descent. This presentation may be in any convenient units such as feet per minute or meters per minute. The window 24 of the device 10 may bear a legend 74 which informs the user of the units represented by the numeric characters 26. The sign or polarity, positive or negative, of the change between adjacent digital depth-representative outputs 63 from the facility 62 is utilized by the microprocessor 68 to activate one of the arrows 28 or 30 depending on whether the device 10 is ascending or descending. Each time the microprocessor 68 samples the output 63 of the facility 62, a new "delta" is calculated. Each successive new "delta" effects energization of the display 22, so that the display 22 presents the real-time, actual rate of ascent or descent, and not merely a go/no-go indication that a "standard" ascent or descent rate is being exceeded.

In order to conserve the battery 46, the bezel 34 may be turned to close the switch 36 only when a dive is being undertaken.

Those skilled in the art will appreciate that the foregoing description is merely representative of selected embodiments of the present invention, as defined in the appended claims, which cover the foregoing and equivalent structure and function.

I claim:

1. A portable device for use during diving in water, which comprises:
    an enclosure having a hermetically sealed volume;
    a window in the enclosure;
    a display located within the volume and visible through the window;
    a non-temperature-sensitive, hysterisis-free, solid state pressure transducer within the volume, the transducer producing a first output proportional to the pressure of a surrounding ambient;
    first means within the volume for converting the first output to a second output proportional to the depth of the device in the ambient;
    second means within the volume for periodically sampling the second output after equal successive time intervals, for comparing successive second outputs, and for producing third outputs indicative of the rate of change of depth with time;
    third means within the volume for activating the display in response to the third outputs so that the display presents both visually detectable indicia indicative of the actual real-time rate of ascent or descent in the ambient and visually detectable indicia indicative of whether ascent or descent is occurring;
    a power source for selectively energizing the display, the transducer, the converting means, and the first, second and third means;
    a compartment for the power source formed in the enclosure separately from the volume, the compartment when closed providing the power source with an ambient-proof environment, the compartment permitting access to the power source for replacement or testing without invading or otherwise affecting the hermetic character of the volume;
    a backdrop for the display, the backdrop and the indicia having contrasting visual characteristics; and
    fourth means for selectively connecting and disconnecting the power source to the display, the transducer, and the first, second and third means without invading the hermetic character of the enclosure.

2. A device as in claim 1, wherein;
    the indicia are a dark color, and the backdrop is a light color.

3. A device as in claim 2 wherein:
    the indicia are black, and the backdrop is silver.

4. A device as in claim 3, wherein:
    the backdrop is reflective.

5. A device as in claim 4, wherein:
    the display is a liquid crystal display.

6. A device as in claim 1, wherein:
    the fourth means comprises:
    a normally open, magnetically operated switch within the volume, the switch when closed electrically connecting the power source in the compartment to the display, the transducer, and the first, second and third means;
    a rotatable bezel mounted to the exterior of the enclosure and surrounding the window and;
    a magnetic member carried by the bezel, rotation of the bezel to position the magnetic member proximate to the switch closing the switch, rotation of the bezel to position the magnetic member remote from the switch permitting the switch to open.

7. A device as in claim 6, wherein:
    the switch is a reed switch.

8. A device as in claim 1, wherein:
    the indicia indicative of the actual, real-time rate of ascent or descent have units of feet per minute.

9. A device as in claim 1, wherein:
    the indicia indicative of whether ascent or descent is occurring are arrow-like characters respectively pointing toward the top and the bottom of the display.

10. A device as in claim 1, wherein:
    the first, second and third means include a microprocessor which executes a non-volatile program stored in a read-only memory.

11. A device as in claim 1, wherein:
    the transducer includes:
    a diaphragm,
    four piezoresistive strain gauge resistors implanted or diffused in the diaphragm and connected together in a Wheatstone bridge configuration,
    the diaphragm deflecting by an amount responsive to pressure of the ambient so that the output of the bridge is proportional to such pressure.

12. A device as in claim 1, wherein:
    the fourth means comprises a pressure-responsive switch which connects the power source in the compartment to the first, second and third means when the ambient pressure reaches a predetermined value.

13. A device as in claim 1, which is intended to be wrist-worn and which further comprises:

a wrist strap attached to the enclosure.

14. A device as in claim 1, which further comprises:
a legend carried by the window, the legend informing what are units of the real-time rate of ascent or descent presented by the numeric indicia of the display.

15. A portable, wrist-worn or dive-console-mounted device for use during diving, which comprises:
an enclosure having a hermetically sealed volume;
a window in the volume;
a display located within the volume and visible through the window, the display being a liquid crystal display capable of generating black indicia;
a non-temperature-sensitive, hysterisis-free, solid state pressure transducer within the volume, the transducer producing a first output proportional to the pressure of a surrounding ambient, the transducer including:
 (a) a diaphragm, and
 (b) four piezoresistive strain gauge resistors implanted or diffused in the diaphragm and connected together in a Wheatstone bridge configuration,
the diaphragm deflecting by an amount responsive to pressure of the ambient so that the first output from the bridge is proportional to such pressure;
first means within the volume for converting the first output to a second output representative of the depth of the device in the ambient;
second means within the volume for periodically sampling the second output after successive equal time intervals, for comparing successive second outputs, and for producing third outputs indicative of the rate of change of depth with time;
third means within the volume for activating the display in response to the third outputs so that the display presents both visually detectable indicia indicative of the actual, real-time rate of ascent or descent in the ambient and visually detectable arrow-like characters to indicate whether ascent or descent is occurring;
a micro-processor within the volume forming a part of the first, second and third means, the microprocessor executing a non-volatile program stored in a read-only memory;
a power source for energizing the display, the transducer, the converting means, the sampling and comparing means, and the activating means;
a compartment for the power source formed in the enclosure separately from the volume, the compartment when closed providing the power source with an ambient-proof environment, the compartment permitting access to the power source for purposes of replacement or testing without invading the hermetic character of the volume;
a reflective silver backdrop for the display, the backdrop and the indicia having highly contrasting visual characteristics;
fourth means for selectively connecting and disconnecting the power source to the display, the transducer, and the first, second and third means without invading or otherwise affecting the hermetic character of the volume, the fourth means including:
 (a) a normally open magnetically operated switch within the enclosure, the switch when closed electrically connecting the power source in the compartment to the display, the transducer, and the first, second and third means,
 (b) a rotatable bezel mounted to the exterior of the enclosure and surrounding the window, and
 (c) a magnetic member carried by the bezel, rotation of the bezel to position the magnetic member proximate to the switch closing the switch, rotation of the bezel to position the magnetic member remote from the switch permitting the switch to open; and
a legend carried by the window, the legend informing what are the units of the real-time rate of ascent or descent presented by the numeric indicia of the display.

* * * * *